US008326310B2

(12) United States Patent
Hu

(10) Patent No.: US 8,326,310 B2
(45) Date of Patent: *Dec. 4, 2012

(54) SCHEDULING METHODS FOR CONNECTION-BASED, OVER-THE-AIR, INTER-SYSTEM COMMUNICATIONS FOR WIRELESS NETWORKS

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,641

(22) Filed: Jun. 29, 2011

(65) Prior Publication Data

US 2011/0286421 A1 Nov. 24, 2011

Related U.S. Application Data

(63) Continuation of application No. 11/739,559, filed on Apr. 24, 2007, now Pat. No. 8,023,956.

(60) Provisional application No. 60/807,288, filed on Jul. 13, 2006, provisional application No. 60/745,981, filed on Apr. 28, 2006.

(51) Int. Cl.
*H04W 72/00* (2009.01)

(52) U.S. Cl. .................... 455/452.1; 455/11.1; 455/13.1; 455/450; 455/443; 455/448; 370/395.41; 370/237; 370/329; 370/341; 370/348; 370/401; 370/461; 370/468

(58) Field of Classification Search .................. 455/11.1, 455/13.1, 450, 443, 448; 370/395.41, 237, 370/329, 341, 348, 401, 461, 468
See application file for complete search history.

(56) References Cited

U.S. PATENT DOCUMENTS

| 5,822,361 | A | 10/1998 | Nakamura et al. |
| 5,862,142 | A | 1/1999 | Takiyasu et al. |
| 6,487,392 | B1 | 11/2002 | Sonetaka |
| 6,501,940 | B1 | 12/2002 | Koga |
| 2003/0224787 | A1 | 12/2003 | Gandolfo |
| 2004/0028003 | A1 | 2/2004 | Diener et al. |
| 2004/0102219 | A1 | 5/2004 | Bunton et al. |

OTHER PUBLICATIONS

Cordeiro, Carlos et al.; IEEE 802.22: An Introduction to the First Wireless Standard based on Cognitive Radios; Journal of Communications; Apr. 2006; vol. 1, No. 1; 2006 Academy Publisher, pp. 70.
Hu, Wendong et al.; IEEE P802.22 Wireless RANs; Connection Based Over-the-air Inter Base Station Communications: Logical Control Connection and its Application to Credit Token based Rental Protocol; Jul. 10, 2006; pp. 17.
Hu, Wendong et al.; IEEE P802.22 Wireless RANs, Wireless RAN Standard PHY and MAC Proposal; Jan. 1, 2006; pp. 60.
European Search Report on European Patent Application No. EP 07 25 1782-4, Mar. 12, 2012, pp. 9.

*Primary Examiner* — Nimesh Patel
(74) *Attorney, Agent, or Firm* — Hogan Lovells US LLP

(57) ABSTRACT

A method for communications between neighboring wireless cells such as wireless regional area networks operating according to IEEE 802.22 specifications. The method involves scheduling inter-base station communications for over-the-air connections to allow neighboring base stations to communicate in environments where a single available channel is shared between the neighboring cells or where two or more channels used by two or more neighboring cells. In some embodiments, a bridge system, such as a bridge consumer premise equipment (CPE), positioned in an area of coverage overlap between two cells is used for inter-base station communications, and allocation and scheduling of bandwidth on the utilized channels is performed to provide interference free communications between the base stations. Existence announcements are provided in coexistence time slots and requests for bandwidth such as reserved and additional time slots are transmitted between the base stations using the coexistence time slots.

21 Claims, 13 Drawing Sheets

SCHEDULING METHODS FOR CONNECTION-BASED, OVER-THE-AIR, INTER-SYSTEM COMMUNICATIONS FOR WIRELESS NETWORKS

CROSS-REFERENCE TO RELATED APPLICATIONS

This application is a continuation of and claims the benefit of U.S. patent application Ser. No. 11/739,559 filed Apr. 24, 2007 and claims the benefit of U.S. Provisional Application No. 60/807,288 filed Jul. 13, 2006 and U.S. Provisional Application No. 60/745,981 filed Apr. 28, 2006. The disclosure of the foregoing United States Patent Application is specifically incorporated herein by this reference.

BACKGROUND OF THE INVENTION

1. Field of the Invention

The present invention relates, in general, to communication systems and methods to support communications and messaging between neighboring base stations that operate networks (e.g., wireless regional area networks (WRANs), cells, or the like), and, more particularly, to a method, and systems/devices configured to perform such a method, for scheduling communications between base stations or control systems of neighboring WRAN or wireless cells or networks. The described method and systems may be used for scheduling connection-based, over-the-air communications between base stations operating in compliance with standards and protocols for wireless networks such as those distributed by the IEEE 802.22 Working Group.

2. Relevant Background

Many countries are striving to provide wireless broadband access or digital cellular communications to all or large portions of their citizens. Much of the population is in rural and remote areas away from cities and urban areas which can receive wireless services with existing infrastructure. Recent studies have indicated in the radio spectrum that licensed bands, such as TV or UHF bands, are underutilized. In the United States, the Federal Communications Commission (FCC) issued the "TV band Notice of Proposed Rule Making (NPRM)" that proposed allowance of unlicensed radios to operate in the TV broadcast bands as long as no harmful interference is caused to incumbent services such as TV receivers. In response, the Institute of Electrical and Electronics (IEEE) formed the IEEE 802.22 working group in 2004 to develop protocols for an interoperable air interface for use in spectrum allocated to TV broadcast service and enable providing wireless services such as broadband access with a point to multipoint wireless regional area network (WRAN). The WRAN system is intended to provide packet-based transport capabilities such as wireless broadband services, i.e., Internet access, data transport, streaming video, VoIP, and other services that are presently available to much of the population using digital subscriber (DSL) technologies or digital cable modems.

WRAN technology has been initially targeted at wireless broadband or remote access for geographically dispersed, sparsely populated areas. The use of TV broadcast bands or UHF bands as a license exempt spectrum for WRAN provides a non-line of sight transmission range of up to 100 kilometers but more typically 30 to 70 kilometers, which is significantly greater than ranges available with WiFi and wireless networks. The target markets or users of the WRAN-based services are single family residential units, multi-dwelling units, small office/home office (SOHO) locations, small businesses, and remote public and private campuses. A WRAN system based on IEEE 802.22 protocols will likely make use, in a non-interfering manner, of unused TV broadcast channels, i.e., TV channels with bandwidths of 6, 7, and 8 MHz in a frequency range of 41 to 910 MHz (e.g., 54 to 862 MHz in the United States with a 6 MHz channel bandwidth).

An IEEE 802.22 system is generally a fixed point-to-multipoint wireless air interface in which the point is a base station (BS) that manages its own cell or coverage area and all associated consumer premise equipments (CPEs) or multipoints. Each CPE represents the user of the wireless services provided by the BS operator. During operations, the BS controls the medium access in its cell such as by setting the channel used for BS and CPE broadcasts to form the wireless link. The BS transmits in the downstream to the various CPEs, which respond back to the BS in the upstream direction, and these communications may be thought of as downlink and uplink communications or signals. The BS and CPE need to be designed to communicate without interfering with licensed or primary users. With this in mind, the BS manages spectrum or channel usage and uses sensing of existing channels to protect incumbent or primary users. To achieve distributed sensing, cognitive radio and/or software defined radio technology provides real-time sensing of spectrum usage. For example, the BS of the WRAN generally will be capable of performing distributed sensing which involves the CPEs sensing the spectrum and sending periodic reports to the BS. The sensing may be in-band to sense on the channel being used by the BS and CPE and/or out-of-band to sensing on the other channels (such as with an omni-directional antenna). Incumbent sensing also generally includes the BS periodically quieting the channel to allow in-band measurements to be carried out. If an incumbent or other use is detected by the BS based on reported measurements and preset interference detection thresholds, the BS makes the decision of whether to continue using the channel or to vacate the channel (i.e., to switch or hop to another vacant frequency). In addition to protecting incumbent or licensed services, WRANs under IEEE 802.22 are unlicensed and a BS servers a large area. As a result, coexistence amongst overlapping or coallocated cells must be managed and controlled by the BSs of the WRAN so that self-interference among neighboring BSs does not render the system useless.

Under IEEE 802.22 and other existing protocol, the issue of communication between neighboring base stations has not been fully addressed or resolved. For example, managing coexistence of WRAN with overlapping coverage areas demands at least periodic communications between the base stations operating the WRAN to effectively control interference, to share sensing information, and to plan channel usage. In some systems of wireless cells or networks, the operators may want to share resources, and this also requires reliable inter-system communications be provided in the systems. It may be feasible in some applications to provide wired communications, such as communications over land-based systems such as the Internet. However, in many systems, the inter-system communications must be mainly or at least partially performed over the air or in a wireless manner. A further difficulty is that neighboring base stations cannot communicate directly due to range or coverage issues.

Hence, there remains a need for improved methods, and devices that implement such methods, for managing communications between neighboring base stations (e.g., between overlapping WRANs). Preferably, such methods and devices would be configured to be compliant with IEEE 802.22 protocols and would be useful in situations where neighboring WRAN share the use of one or more available channels.

SUMMARY OF THE INVENTION

To address the above and other problems, a method, and associated systems implementing such a method, is provided to facilitate communications between neighboring wireless cells such as WRANs operating according to IEEE 802.22 or other wireless communication protocols. The method involves scheduling inter-base station communications for over-the-air connections, such as logical control connections, to allow neighboring base stations to communicate in environments where a single available channel is shared between the neighboring cells and also where two or more channels are used by two or more neighboring cells or WRANs. In some embodiments, a bridge system, such as a bridge consumer premise equipment (CPE), positioned in an area of coverage overlap between two cells is used for inter-base station communications, and allocation and scheduling of bandwidth on the utilized channels is performed to provide interference free communications between the base stations.

More particularly, a method is provided for scheduling communications between base stations operating wireless networks over a shared channel. The method includes providing a first base station having a wireless service connection on the shared channel with a bridge CPE system, e.g., a CPE that is configured for receiving and transmitting to more than one base station. The bridge CPE system acts to establish a wireless coexistence connection over the shared channel with a second base station. The method further includes releasing the shared channel with the first base station, and after the releasing, operating the second base station to establish wireless service connections with one or more CPE systems over the shared channel. The second base station further acts to allocate time slots (e.g., reserved time slots and/or additional time slots) as part of usage of the shared channel for communications between the first base station and the bridge CPE system, and during these allocated time slots the second base station and its CPE systems do not transmit on the shared channel. The method further includes transmitting coexistence information from the first base station to the second base station, including performing communications between the first base station and the bridge CPE during the allocated time slots.

Existence of the neighboring base stations may be achieved through use of existence announcements in the coexistence time slots (CTS) on the shared channel that are captured and reported by the bridge CPE system. Before the first base station releases the shared channel, the second base station may send a coexistence request, e.g., with spectrum contention information, to the first base station via the bridge CPE system using a CTS, and the coexistence connection may be established when the second base station wins a spectrum contention for the shared channel to enable communications between the bridge CPE system and the first base station on the shared channel after release by the first base station. After the first base station releases the channel, the first base station generally will monitor, at least periodically, any allocated time slots on the channel for feedback messages from the bridge CPE system (e.g., slots scheduled in the uplink subframe). The coexistence information may be transmitted from the bridge CPE system to the second base station through assigned transmission opportunities granted or defined in a transmission schedule on the shared channel (e.g., a MAP of TDMA transmissions).

In another embodiment, an inter-base station communications method is provided for use in scheduling communications between two or more base stations that are operating wireless cells or networks on two or more channels, such as channels in the TV band or the like. The method includes providing a first base station with a wireless service connection on a first channel with a bridge CPE and providing a second base station with a wireless service connection on a second channel with a plurality of standard CPEs. The method further includes announcing the existences of the first and second base stations by transmitting announcements in coexistence time slots on the first and second channels, respectively, which are captured by the bridge CPE and forwarded to the other one of the base stations such that each base stations knows of the other base station and its channel usage. The bridge CPE also establishes a wireless coexistence connection over the second channel with the second base station. The method continues with the first and second base stations communicating, such as by sharing coexistence information including scheduling mutual switches between the first and second channels, via the bridge CPE using the first and second channels and operating the bridge CPE periodically on both channels. The inter-base station communicating may include scheduling periodic coexistence polling slots on the first channel with the first base station for communications between the first base station and the bridge CPE system and on the second channel with the second base station for communications between the second base station and the bridge CPE system. The method may also include the first base station scheduling the bridge CPE system to communicate with the second base station using the coexistence connection for a coexistence operation period (such as up to 2 frames or more).

DETAILED DESCRIPTION OF THE PREFERRED EMBODIMENTS

The present invention is directed to methods and systems for managing communications between nearby or neighboring wireless networks or cells. The methods and systems described herein are particularly suited for scheduling communications between base stations or other controlling systems that operate wireless networks or cells that have overlapping coverage and have a need to share information and/or resources. For example, overlapping networks or cells may operate effectively cooperatively or through coexistence and control interference whether they are operating on two or more channels with or without sharing or on a single channel that is shared to provide service in the cell or network. The following description describes scheduling methods for managing over-the-air base station communications, which may be labeled a logical control connection, that is well suited for providing coexistence in IEEE 802.22-based systems, e.g., systems having two or more neighboring wireless regional area networks (WRANs). Each cell or WRAN generally has a base station, e.g., an IEEE 802.22 self-coexist base station (BS), that provides wireless service such as digital cellular communications, broadband access to the Internet, and the like to consumer premise equipment (CPE), e.g., end users such as residences or small businesses.

In the following example, two main scenarios or implementations are described. First, with reference to FIGS. 1-8, a method is described applying a logical control connection to schedule communications between two base stations (e.g., two license exempt WRAN or the like) that are sharing a single channel to service their clients or CPEs. Second, beginning with FIG. 9, a method is described applying the scheduling techniques of the invention to systems in which two or more WRAN systems share two or more channels. In the first scenario or implementation, the scheduling method generally makes use of coexistence bandwidth allocation and bandwidth reservation to assure reliable communications and minimal delay in re-establishing communications between base stations and a bridge CPE used to provide an inter-base station connection or link In the second scenario or implementation, the scheduling method uses coexistence polling slots (CPS) that are scheduled by coexisting base stations for asynchronized BS-to-bridge CPE communications.

Figure 1:
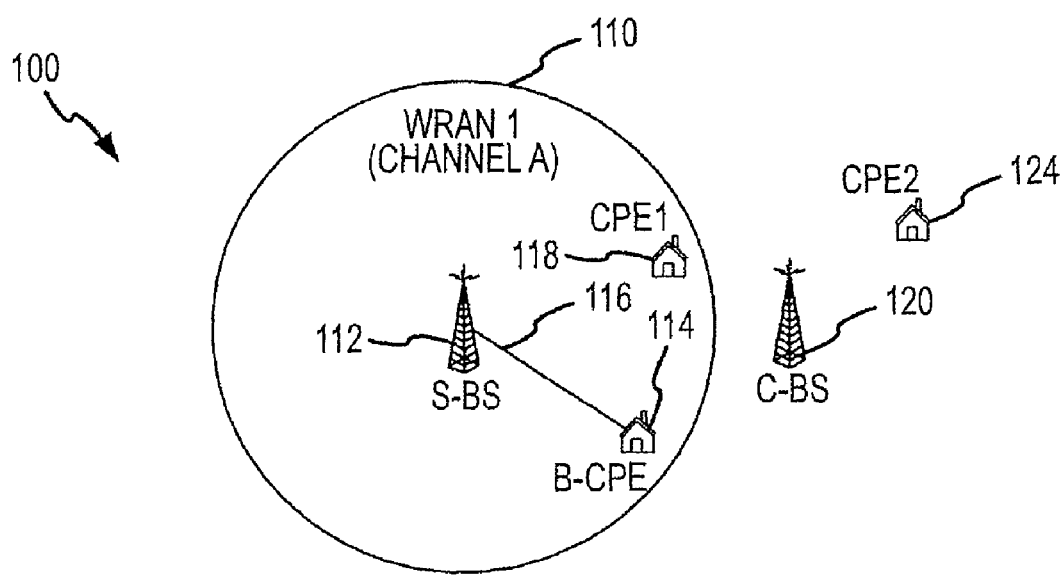
FIG. 1 illustrates a wireless communications system, such as an 802.22-based WRAN system in which a service or primary base station is occupying a single channel to service CPEs in a cell or WRAN prior to establishment of coexistence with another base station, e.g., a coexistence base station.

FIG. 1 illustrates a wireless communications system 100 in which two base stations 112, 120 operate by sharing a channel ("Channel A") and communicate using an embodiment of the scheduling method of the present invention for inter-base station communications. Many wireless communication networks may be configured to communicate according to these concepts, and the concepts are well-suited for use with WRAN, such as WRAN1 110, and are configured according to the protocols and specification of IEEE 802.22. The wireless communications system 100 is shown to include an operating WRAN 110 that includes a base station or BS 112 that provides a point-to-multipoint arrangement in which the BS 112 is used to provide a service such as digital cellular communications, wireless broadband access to provide an Internet or similar connection, or other wireless service. The BS 112 is configured in some embodiments as 802.22 a base station that communicates with a license exemption over licensed bands such as the TV bands of the radio spectrum to a plurality of CPEs, such as B-CPE 114 and CPE1 118, positioned in their cells or coverage areas 110, which are shown by the circular outline in FIG. 1.

The communications between the BS 112 and CPEs 114 and 118 are performed while protecting incumbent or primary services, such as existing TV broadcasters/receivers, such as through the use of distributed sensing performed by the CPE and reported to the BS for processing to allow coordinated channel selection. The BS 112 and CPEs 114 and 118 are not shown in detail in FIG. 1, but in IEEE 802.22 embodiments, the BS 112 and CPEs 114, 118 of the wireless communications system 100 may include transmitter and receiver equipment to facilitate communication over the TV band. The BS 112 and CPEs 114, 118 may be configured according to cognitive radio technologies to include equipment for sensing use of frequencies or channels and to process such sensed energies or information to make channel selection decisions. The system 100 further includes a coexistence base station or C-BS 120 that has an overlap coverage area with service base station or S-BS 112 in which the bridge CPE 114 is located. The C-BS 120 may need to share resources such as Channel A with S-BS 112 to provide services to its CPE such as CPE2 124, and to this end, the C-BS 120 preferably utilizes the communications scheduling method described herein.

Figure 2:
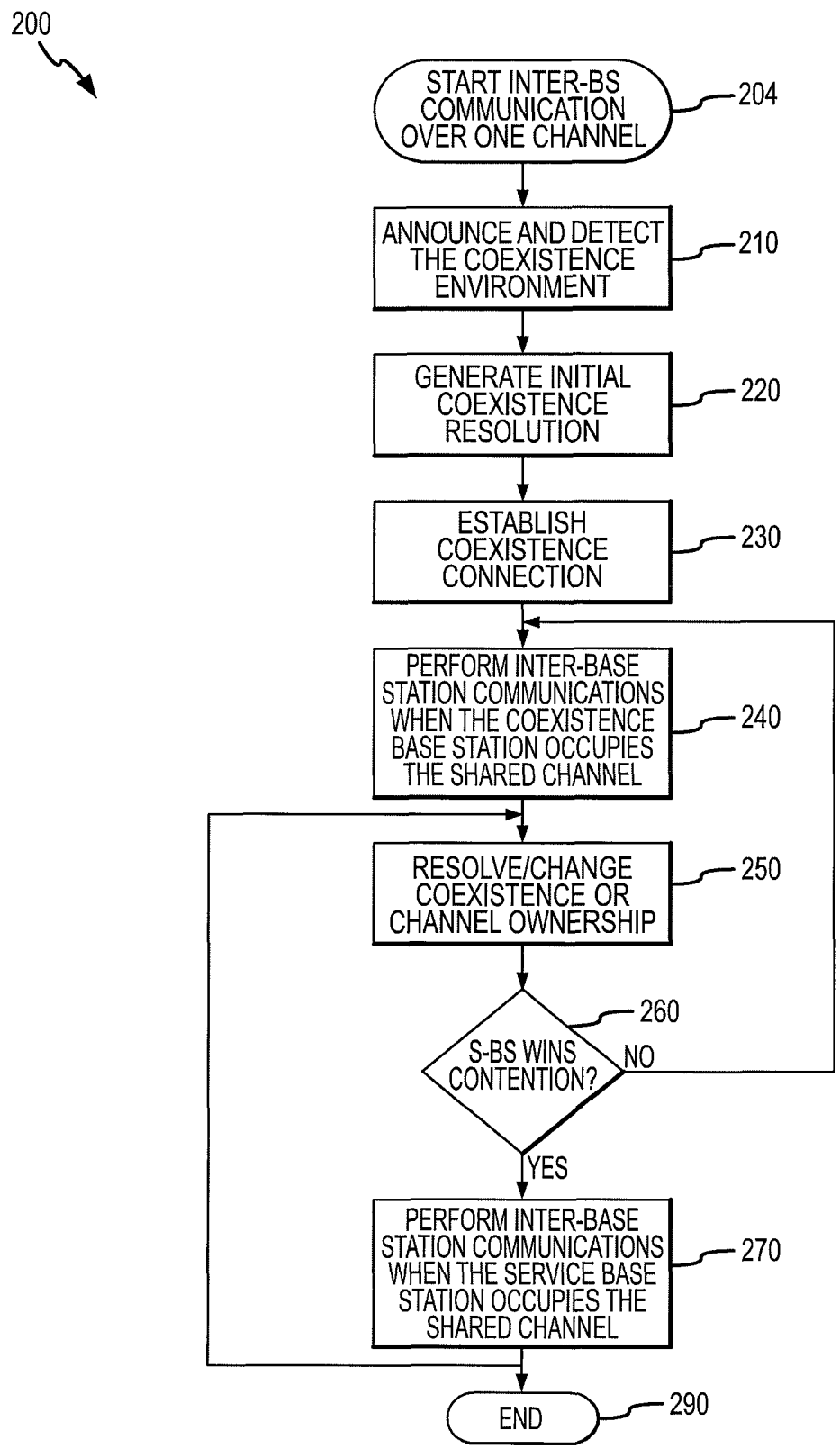
FIG. 2 illustrates one embodiment of a method, which may be implemented in the system of FIG. 1, for managing or scheduling communications between neighboring base stations to manage coexistence and sharing of resources such as a single channel.
Figure 3:
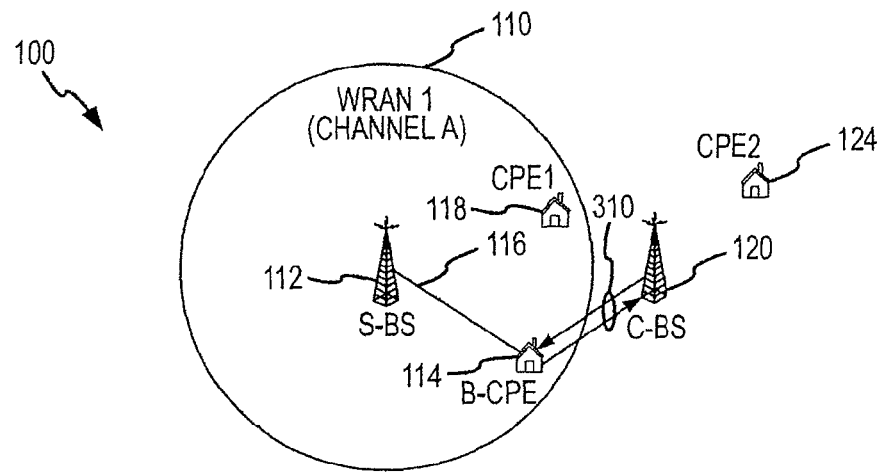
FIG. 3 illustrates the wireless communications system of FIG. 1 during announcement and detection of a coexistence scenario or environment.

FIG. 2 illustrates an exemplary communications scheduling or management method 200 useful for wireless communication networks that are sharing a single channel such as wireless communications system 100 of FIG. 1. The method 200 is discussed in detail in the following paragraphs with reference to FIG. 1 and also with further illustration provided by FIGS. 3-8. The method 200 begins at 204 in an initial condition of the wireless communications system 100 of FIG. 1. In this initial condition, a service connection 116 has been established between S-BS 112 and a CPE 114 that has been configured to be a bridge CPE (or B-CPE). In this regard, the B-CPE 114 likely will include a direction antenna that is directed toward the S-BS 112 for service connection (and later coexistence connection) 116, and B-CPE 114 also will include an extra direction antenna directed for communications with C-BS 120 to provide a coexistence connection between the two base stations 112, 120. The B-CPE 114 may also include additional software/hardware or modified software/hardware to perform the functions described herein that may not typically be performed by standard CPEs such as CPE1 118 or CPE2 124. In FIG. 1, the C-BS 120 is about to start service provisions, but CPE1 118 and CPE2 124 have not yet been associated with any base station.

Figure 4:
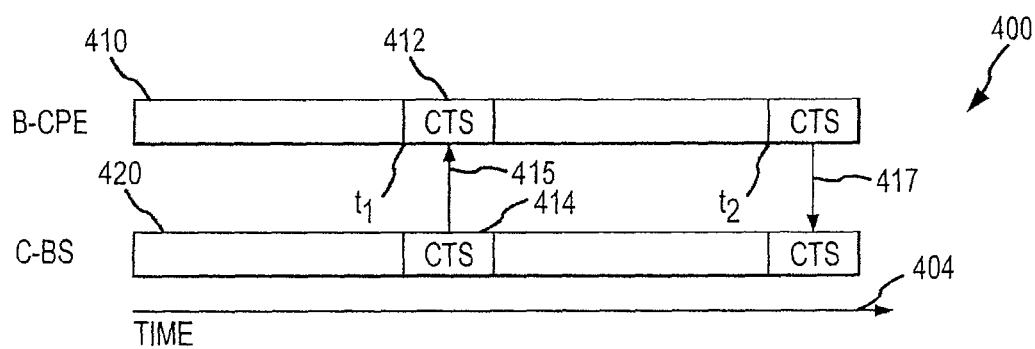
FIG. 4 shows exemplary usage of the single channel during announcement and detection of a coexistence base station by a primary or service base station such as during operation of the system shown in FIG. 3.

Scheduling method 200 continues at 210 with the C-BS announcing its presence and the S-BS detecting the present of a coexistence environment or situation. In the embodiment shown in FIGS. 3 and 4, the announcement and detection step 210 is achieved in part by communications 310 between the C-BS 120 and the B-CPE 114. In the wireless communications system 100, the BSs 112, 120 and the CPEs 114, 118, 124 operate with synchronized clocks and with pre-defined times for transmitting coexistence information between base stations and bridge CPEs. Referring to FIG. 4, usage 400 of Channel A is shown by B-CPE 114 over time 404 with data transmission/packet graph 410 and by C-BS 120 with data transmission/packet graph 420. As shown, the C-BS 120 announces its existence at a first time, $t_1$, which is a pre-defined time for transmitting coexisting information including announcements by base stations. The B-CPE 114 monitors the shared channel information in this time slot, which may be labeled a coexistence time slot or CTS. CTS are assigned a size and are repeated periodically (or a space and time is reserved in this slot for coexistence information to be passed). The B-CPE 114 acts to capture the announcement with the data transfer shown by CTS 412, 414 and arrow 415 from C-BS 120 to B-CPE 114. The B-CPE 114 then acts to report the captured coexistence announcement to the S-BS 112 (reporting not specifically shown in channel usage 400), such as by use of the service link or connection 116. The S-BS 112 responds by instructing the B-CPE 114 to notify the S-BS's existence to the announcing C-BS 120, which is accomplished through the CTSs as shown at 417 at a second, later time, $t_2$.

Method 200 continues at 220 with generating an initial coexistence resolution. Step 220 in one embodiment includes the C-BS 120 sending a coexistence request, e.g., a spectrum contention for use of Channel A, to the S-BS 112 in the CTS via the B-CPE 114. Then, the S-BS 112 responds to the coexistence requests by providing an answer in the CTS via the B-CPE 114. If the C-BS 120 fails to acquire the channel, e.g., the S-BS 112 determines that the C-BS 120 loses the spectrum contention on Channel A or retains ownership of Channel A for other reasons, the C-BS 120 typically acts to repeat the submitting of the coexistence request in the CTS via the B-CPE 114. If C-BS 120 instead acquires the channel, e.g., wins the spectrum contention on Channel A, several actions are taken. The S-BS 112 instructs the B-CPE 114 to set up a coexistence connection(s) (shown at 560 in FIG. 5) with the C-BS 120 when S-BS 112 releases Channel A. The S-BS 112 also instructs the B-CPE 114 to request one or more "reserved time slots", or RTSs, for ongoing communications between the B-CPE 114 and the S-BS 112 on Channel A after the channel has been released by the S-BS 112. During step 220, the S-BS 112 also provides the B-CPE 114 with a set of parameters (such as spectrum contention numbers and the like) and strategies and/or requirements for the coexistence operations with C-BS 120. In other words, the B-CPE 114 acts as an agent or go-between for the S-BS 112 with the C-BS 120. Finally, at step 220, the S-BS 112 releases Channel A at a time previously agreed to by the S-BS 112 and the C-BS 120.

Figure 5:
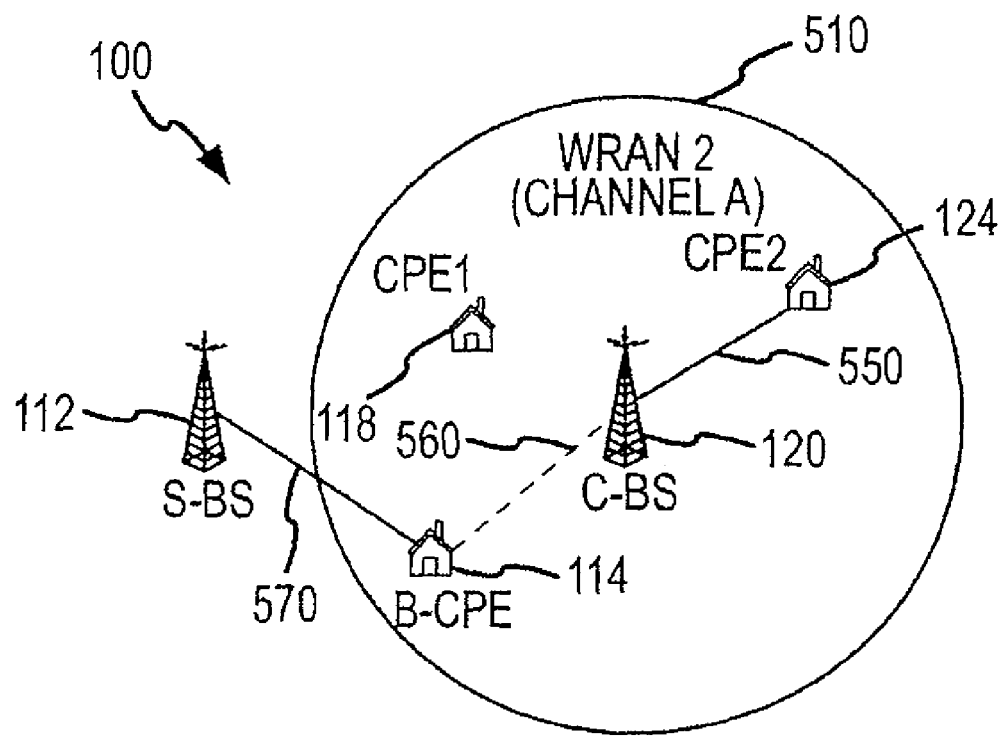
FIG. 5 illustrates the wireless communications system of FIGS. 1 and 3 showing interference free operations when the coexistence base station occupies the single shared channel of the system.

At step 230, the scheduling method 200 for the coexistence connection 560 as shown in FIG. 5. As part of step 230, the B-CPE 114 as previously instructed by the S-BS 112 sets up a coexistence connection(s) 560 with the C-BS 120, and this connection is not part of the service cell or WRAN2 510 for C-BS 120. The B-CPE 114 then uses this coexistence connection 560 to request one or more RTS to allow for communications between the B-CPE 114 and the S-BS 112 on shared Channel A. The use of RTS allows the previous owner (or base station that does not control or occupy the single channel) to communicate with B-CPE 114, which in turn can transfer messages to the C-BS 120, without interfering with the operation of WRAN2 510 on Channel A. Such interference-free operations are shown in wireless communications system 100 in FIG. 5 in which C-BS 120 has established a service connection 550 with CPE2 124 to provide wireless services on Channel A. During such operations, a connection 570 is retained between the S-BS 112 and the B-CPE 114 to allow communications during some or all of the RTS granted by the C-BS 120.

Figure 6:
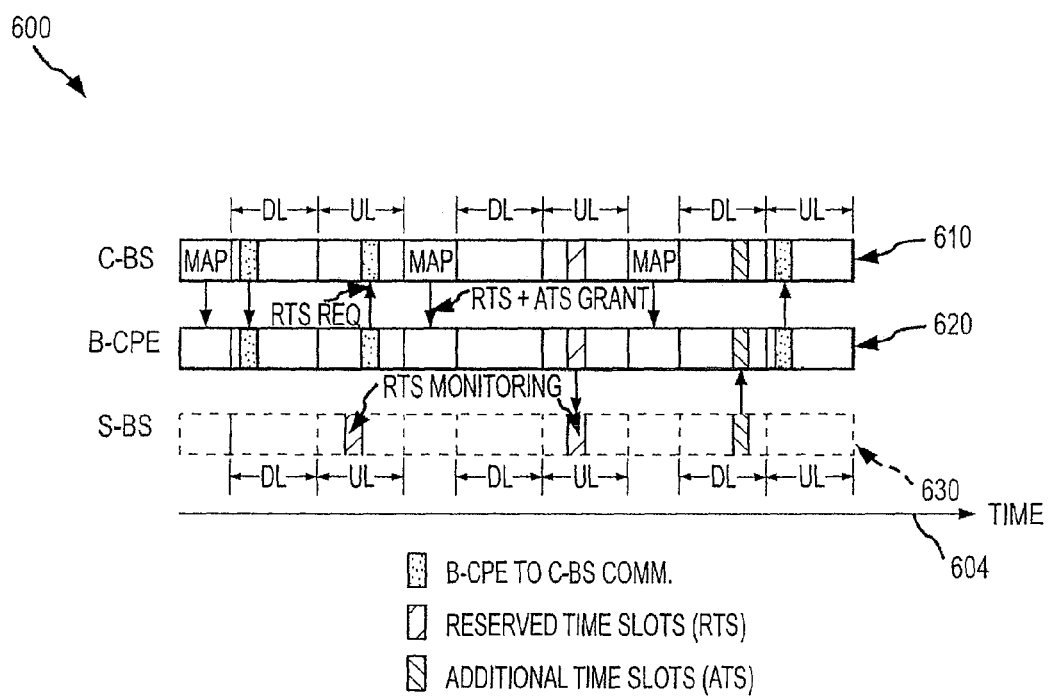
FIG. 6 shows exemplary usage of the shared channel when the coexistence base station occupies the channel to provide inter-base station communications.

After the coexistence connection has been established, the method 200 continues at 240 with performing inter-base station communications, and representative communications 600 are shown in FIG. 6 with channel usages 610, 620, and 630 shown for the C-BS 120, the B-CPE 114, and the S-BS 112. During step 240, inter-BS communications are performed when the C-BS 120 occupies Channel A to provide service in WRAN2 510 as shown in FIG. 5. After the S-BS 112 has released the shared channel, inter-BS communications may include a number of actions or steps. RTS monitoring is performed as the S-BS 112 monitors the RTS for feedback messages from the B-CPE 114, and such RTS monitoring by the S-BS 112 generally is scheduled to occur during the Uplink Sub-frame (e.g., during expected or scheduled communications from CPEs to BSs in typical WRAN operations). The B-CPE 114 may communicate with the C-BS 120 through its coexistence connection 560 by providing messages or data on the channel during assigned transmission opportunities granted by the C-BS 120 on Channel A, e.g., via a C-BS MAP or transmission schedule (such as a TDMA transmission schedule).

Inter-base station communications continue in 240 with the allocation of coexistence bandwidth. The B-CPE 114 sends RTS and additional time slot (ATS) requests to the C-BS 120 through assigned transmission opportunities previously granted by the C-BS 120 for B-CPE 114 to S-BS 112 communications. The C-BS 120 processes these requests and grants the RTS and ATS requests to the B-CPE 114 when appropriate, e.g., based on service levels to WRAN2 510, based on the amount of bandwidth requested by the S-BS 112 in the RTS and ATS requests, and other factors effecting available bandwidth. The C-BS and its associated CPEs, such as CPE2 124, in WRAN2 510 do not transmit during the bandwidth allocated for B-CPE 114 to S-BS communications such as RTS and ATS, and this allocation of communication bandwidth to the non-occupying base station in a coexistence environment or wireless communications system 100 is significant for having reliable communications between the B-CPE 114 and the S-BS 112 given a single, shared channel (e.g., Channel A in the illustrated system 100). These communications are shown in more detail in FIG. 6 using the RTS and ATS.

The B-CPE 114 acts to inform the S-BS 112 the coexistence bandwidth allocation (e.g., RTS and ATS) granted by the C-BS 120 in an RTS that is being monitored by the S-BS 112. This bandwidth (BW) reservation using the RTS is useful for re-establishing B-CPE 114 to S-BS 112 communications without significant delay. In the ongoing inter-base station communications of step 240 when the C-BS 120 occupies Channel A, the S-BS 112 communicates with the B-CPE 114 in the RTS and the ATS as shown in FIG. 6. B-CPE-to-C-BS communications are provided by the B-CPE 114 communicating with the C-BS 120 through the assigned transmission opportunities granted by the C-BS MAP on Channel A.

Figure 7:
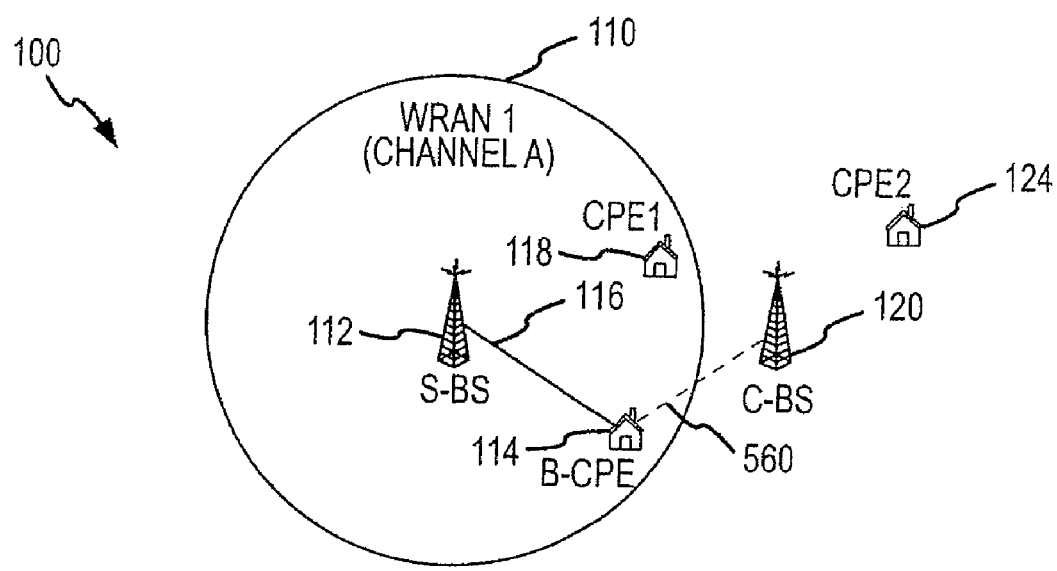
FIG. 7 illustrates the wireless communications system of FIGS. 1, 3, and 5 showing interference free operations when the service base station occupies the shared channel and illustrates the maintenance of a coexistence connection between the base stations via a bridge CPE.

The communications scheduling method 200 continues at step 250 with resolving and/or changing the coexistence such as by switching the channel ownership back to the S-BS 112. During step 250, coexistence information such as spectrum contention numbers is exchanged between the two coexisting base stations 112, 120 via the service connection 570 and coexistence connection 560 (i.e., via the B-CPE 114). A number of mechanisms and techniques may be used in scheduling method 200 to decide a winner of spectrum contention. In one embodiment, on-demand spectrum contention is applied, and in this embodiment, the winner of the contention operates on the single, shared channel and the loser gives up the channel. The RTS request information of the losing base station is sent to the winning base station for the next phase of inter-base station communications. At step 260 of the method 200, the spectrum contention is performed and if the S-BS 112 wins, the method 200 continues at step 270; otherwise, inter-base communications continue at 240 as discussed above. If the C-BS acquires Channel A as shown in FIG. 7, the C-BS 120 ceases service operations on Channel A but B-CPE 114 maintains the coexistence connection 560 with the C-BS 120.

Figure 8:
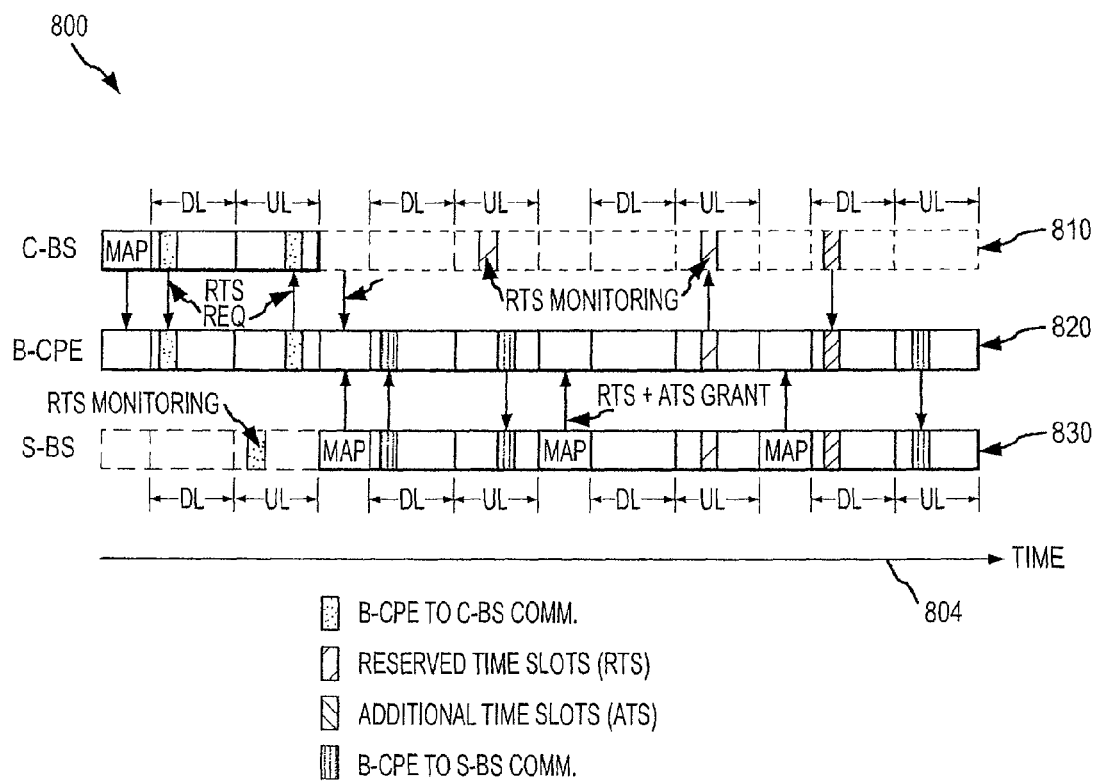
FIG. 8 shows usage of the shared channel over time when the service base station occupies the shared channel such as during operation of the system as shown in FIG. 7.

Inter-base station communications when the S-BS 120 occupies the single channel occur in step 270 of method 200. Exemplary communications 800 are shown in FIG. 8 with channel usages over timeline 804 being shown for the C-BS 120 at 810, for the B-CPE 114 at 820, and for the S-BS 112 at 830. After the C-BS 120 has released Channel A, RTS monitoring is performed by the C-BS 120 monitoring the scheduled or periodic RTS for feedback messages from the B-CPE 114, and in some embodiments, this RTS monitoring is scheduled in the uplink sub-frame as shown in FIG. 8 for B-CPE-to-C-BS communications via RTS monitoring. B-CPE-to-S-BS communications occur as the B-CPE 114 communicates with the S-BS 112 through assigned transmission opportunities granted by the S-BS MAP on Channel A, with communication of the S-BS MAP shown in FIG. 8. Coexistence bandwidth allocation is performed by the S-BS 112 based on the RTS requests sent by the C-BS 120 via the B-CPE 114. The S-BS 112 grants RTS and ATS to the C-BS 120 when appropriate based on a number of factors such as service levels in WRAN1 110 and the like. The B-CPE 114 provides the C-BS 120 with feedback on the granted BS allocation (e.g., RTS and ATS granted) in a RTS as shown in FIG. 8 after RTS and ATS grant message is transmitted per the MAP to the B-CPE 114 from the S-BS 112. B-CPE-to-C-BS communications are performed in the granted RTS and/or the ATS. B-CPE-to-S-BS communications are performed by the B-CPE through the assigned transmission opportunities granted by the S-BS MAP on Channel A, which is occupied presently by the S-BS 112. The scheduling method 200 then involves an iterative process continuing at 250 or, alternatively, the method 200 may end at 290 such as when the channel becomes unavailable or one of the base stations terminates the coexistence relationship.

In the wireless communications system 100 described in FIGS. 1-8, two or more WRAN are operated by sharing a single available channel. In many wireless communication systems, there are more than one available channel and two or more base stations servicing neighboring WRAN may operate to coexist without interference by implementing the communication scheduling method described below. In the following description, a scheduling method is provided for inter-system or inter-base station communications in a system, such as system 900 shown in FIG. 9, in which two wireless networks, such as two 802.22-compliant WRANs, are sharing two available channels. The scheduling method can be generalized and applied to multiple wireless network such as multiple WRAN systems sharing two or more channels. If two channels are available, neighboring WRAN may perform dynamic frequency hopping between the two channels (e.g., channel flipping) as is known in the art and/or exchange channel sensing information in situations where the base stations and related CPEs can sense channels used by neighboring WRAN.

Figure 9:
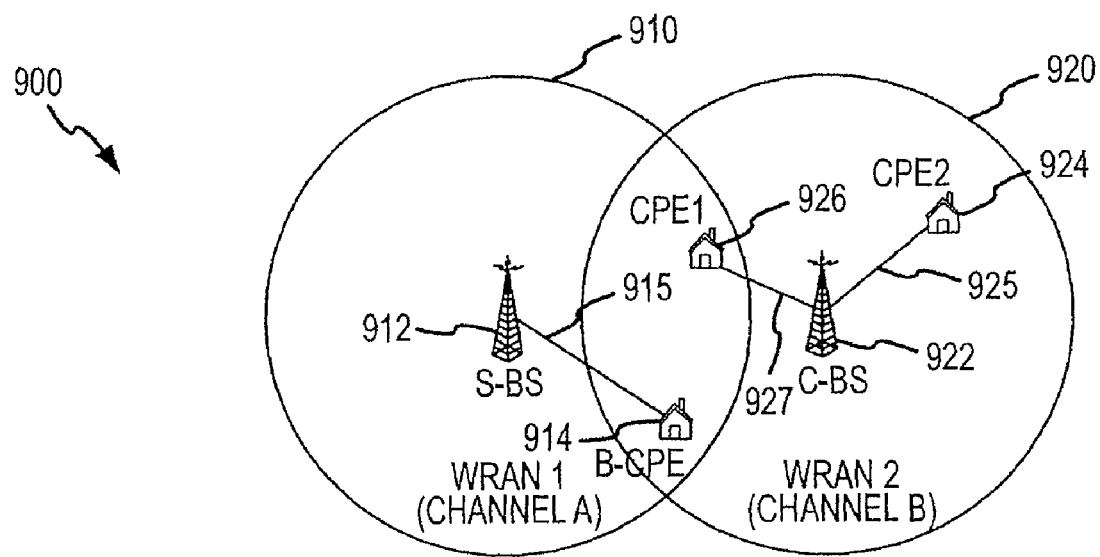
FIG. 9 illustrates a wireless communications system, such as an 802.22-based WRAN system in which two base stations are occupying a two shared channels to service CPEs in cells or WRANs prior to establishment of coexistence with each other, e.g., operating in coexistence scenario or environment.
Figure 10:
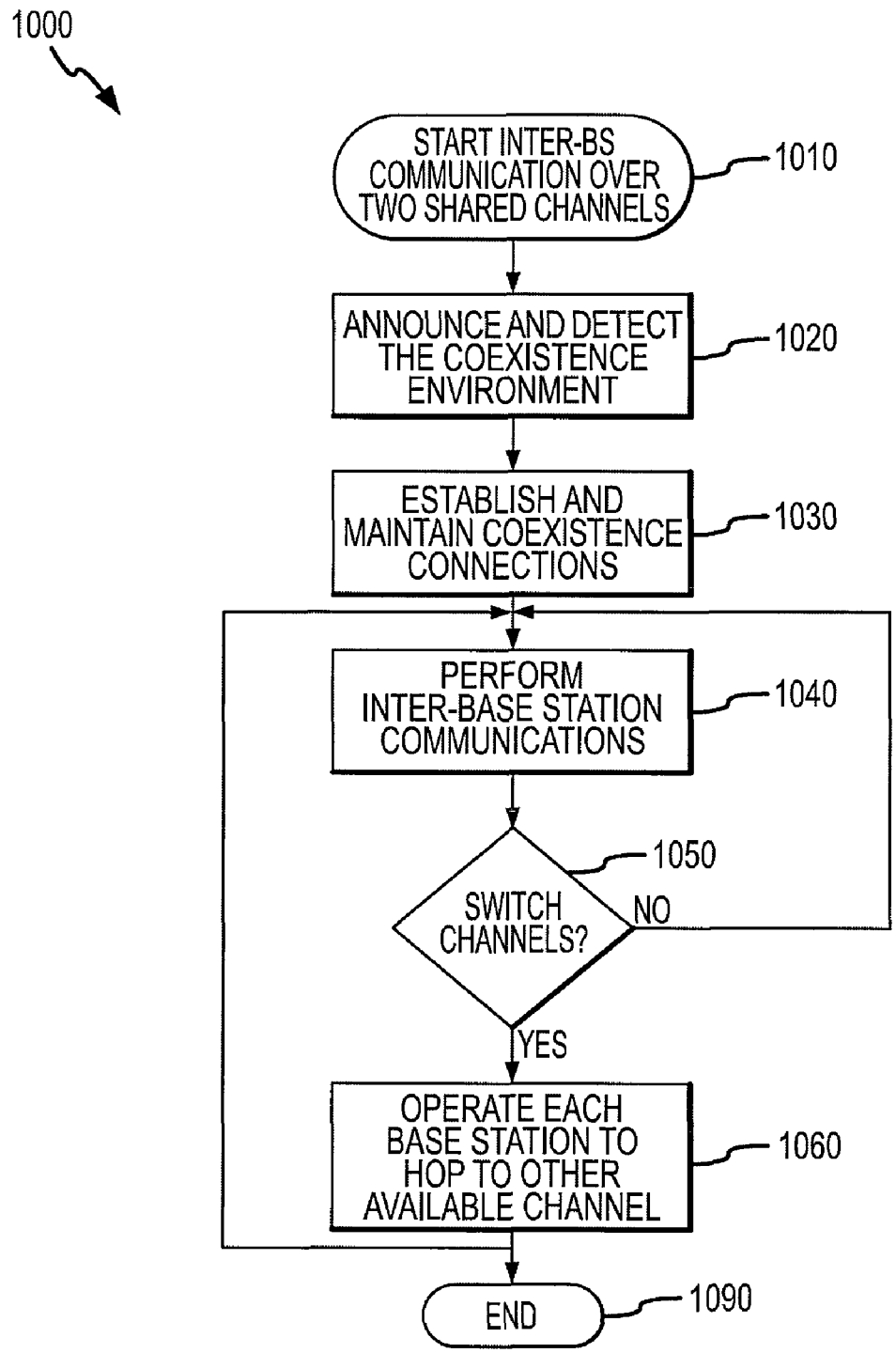
FIG. 10 illustrates one embodiment of a method, which may be implemented in the system of FIG. 9, for managing or scheduling communications between neighboring base stations to manage coexistence and sharing of resources such as a two or more available channels.

FIG. 9 illustrates a wireless communication system 900 that may operate to communicate according to the present invention such as through the use of the scheduling method 1000 shown in FIG. 10. The wireless communications system 900 includes two WRAN 910, 920 that are operated by base stations 912, 922. Base station (or S-BS) 912 occupies a first channel, e.g., Channel A, and during step 1010 of the scheduling method 1000 has established a service connection 915 with a first bridge CPE 914 (labeled B-CPE in FIG. 9) to provide broadband or other wireless service over Channel A. Base station (or C-BS) 922 occupies a second channel, e.g., Channel B, and during initial step 1010 of method 1000 has established service connections 925 and 927 with a second bridge CPE 926 (labeled CPE1 in FIG. 9) and with a standard CPE 924 (labeled CPE2 in FIG. 9). As discussed with reference to FIG. 1, the bridge CPE 914, 926 generally will have antenna directed at the servicing base station as well as at the other, coexisting base station and will be positioned in a physical location of overlapping coverage between the two WRAN 910, 920 as shown in FIG. 9.

Figure 11:
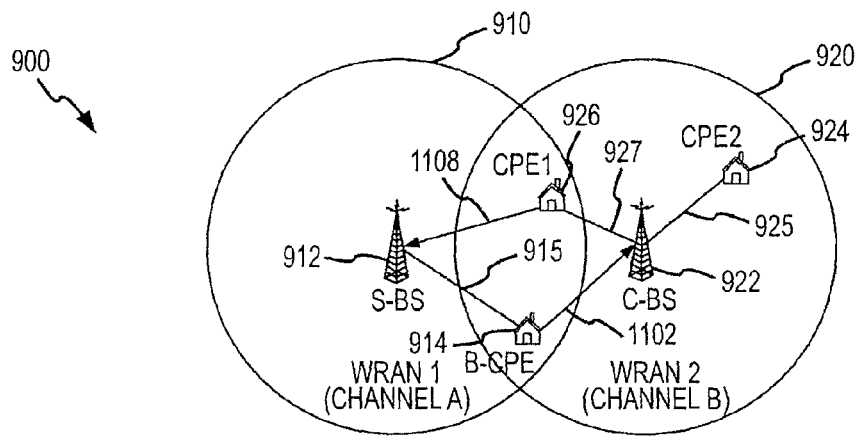
FIG. 11 illustrates the wireless communications system of FIG. 9 during announcement and detection of a coexistence scenario or environment.
Figure 12:
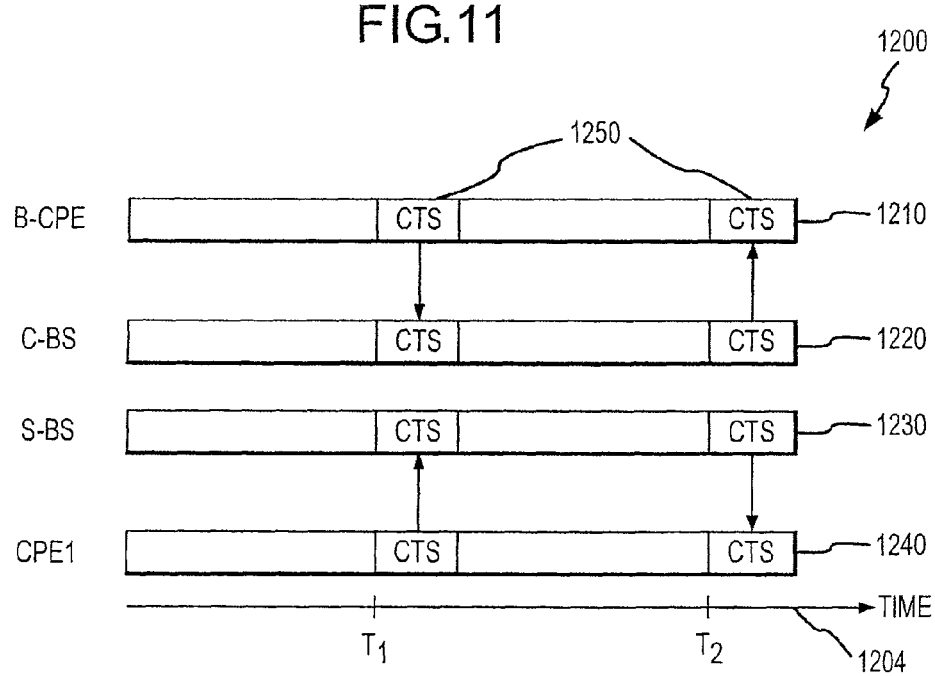
FIG. 12 shows exemplary usage of the two channels during announcement and detection of a coexistence base station by a primary or service base station such as during operation of the system shown in FIG. 11.
Figure 15:
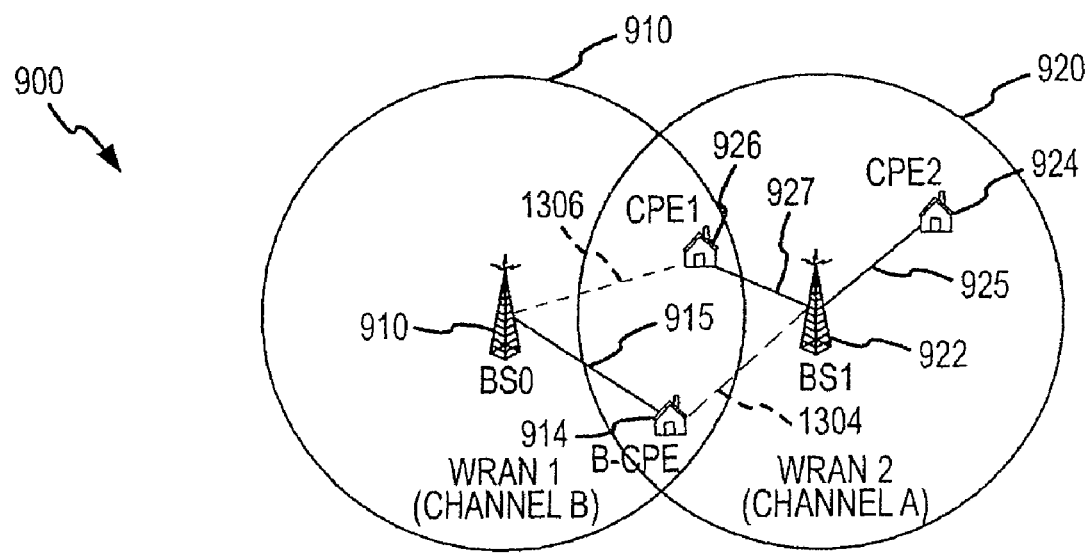
FIG. 15 illustrates the wireless communications system of FIGS. 9, 11, and 13 after a channel switch or hop to a new frequency by the two communicating and coexisting base stations using two channels.

The communications scheduling method 1000 continues at 1020 with announcing and detecting of the coexistence environment, e.g., of the base stations announcing their presence to their neighbor. Step 1020 is illustrated in the wireless communications system 900 shown in FIG. 11 when considered in conjunction with the communications 1200 shown in FIG. 12. FIG. 12 illustrates exemplary over time 1204, the channel usage 1210 by the first bridge or B-CPE 914, the channel usage 1220 by the base station operating on Channel B or C-BS 922, the channel usage 1230 by the base station operating on Channel A or S-BS 912, and the channel usage 1240 by the second bridge or CPE1 926. To announce coexistence, the S-BS 912 and the C-BS 922 announce their existences in the CTS 1250 as shown by the arrows that show the announcements being performed via the bridges, 914 and 926, respectively, but in some embodiments the announcements may be done directly by the base stations themselves. Detection of coexistence occurs as the S-BS 912 and the C-BS 922 capture the existence announcements as well as the channel usages of the other coexisting base station. In the example shown in FIG. 11, announcement and detection is achieved via the bridges 914, 926 with use of CTS as shown with signals or channel usage 1102, 1108. This results in the S-BS 912 detecting that the C-BS 922 is using Channel B and the C-BS detecting that the S-BS 912 is using Channel A. Note, the WRAN 910 and 920 may be operated separately, but there are a variety of reasons and applications in which the WRAN 910 and 920 may usefully share information, such as when channel switching/sharing is utilized as shown in FIG. 15. The scheduling method 1000 supports such inter-base station communications while minimizing risks of interference.

Figure 13:
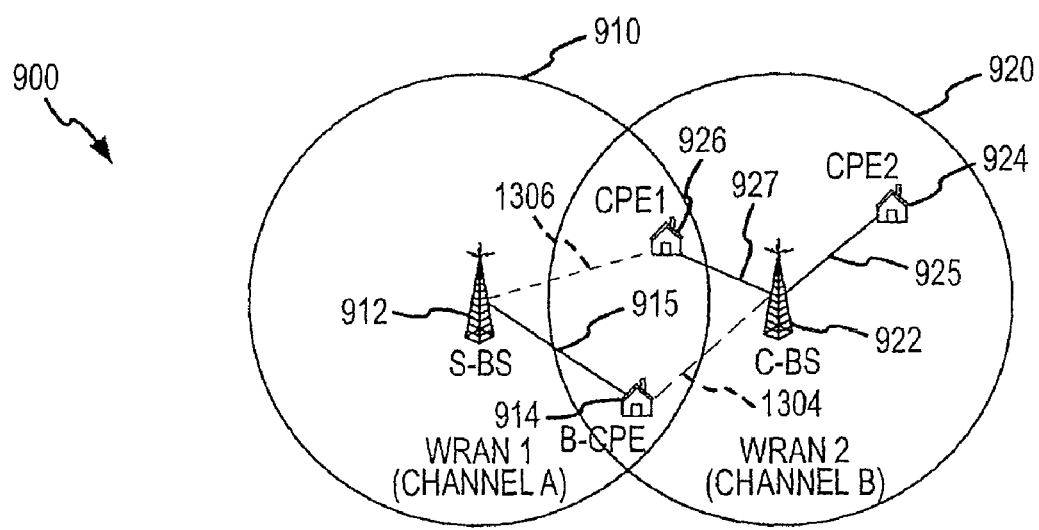
FIG. 13 illustrates the wireless communications system of FIGS. 9 and 11 showing establishment of coexistence connections and during interference-free inter-base station communications.

The method 1000 continues at 1030 with establishing and maintaining coexistence connections. System 900 is shown in FIG. 13 after establishing a coexistence connection 1304 between the B-CPE 914 and the C-BS 922 and a coexistence connection 1306 between the CPE1 926 and the S-BS 912. To this end, the S-BS 912 instructs B-CPE 194 over service connection 915 to establish and maintain a coexistence connection 1304 with neighboring and previously detected C-BS 922 in Channel B (i.e., the operating channel of the WRAN 920 operated by the base station 922). Similarly, the C-BS 922 instructs CPE1 926 to establish and maintain a coexistence connection 1306 with neighboring and detected S-BS 912 in Channel A (i.e., the operating channel of the WRAN 910 operated by the base station 912).

With the coexistence connections 1304, 1306 in place, the inter-base station communications 1040 can proceed to allow S-BS 912 to communicate with C-BS 922, such as via the bridge CPE 914 that was initialized by S-BS 912 (or, alternatively, communications may be through bridge CPE 926 initialized by C-BS 922). The inter-base station communications are shown at 1400 in FIG. 14 over time with exemplary channel usages by the C-BS 922 at 1410, by the B-CPE 914 at 1420, and by the S-BS 912 at 1430. Inter-base station communications are supported by use of periodic coexistence polling slots. After coexistence connection 1304 with the C-BS 922 has been established with the B-CPE 914, the C-BS 922 periodically schedules coexisting polling slots (CPS) for asynchronized B-CPE-to-C-BS communications. The S-BS 912 also schedules periodic CPS to reestablish communications with the B-CPE 914 after coexistence communications between the B-CPE 914 and the C-BS 922 have been completed.

Figure 14:
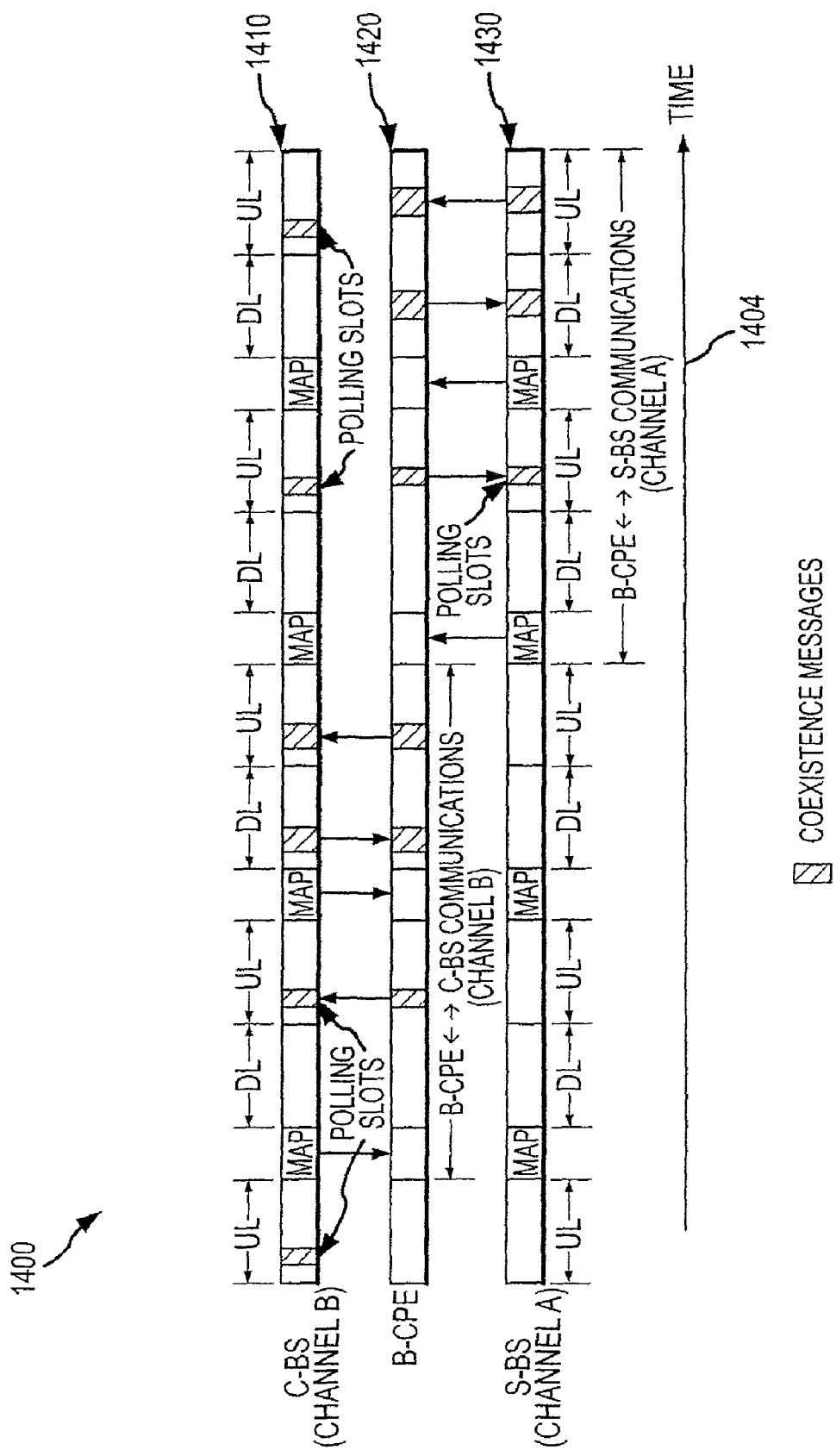
FIG. 14 illustrates exemplary channel usage of the two channels during coexistence and interference free operations.

The communications 1400 continue with B-CPE-to-C-BS communications. These communications include the S-BS 912 scheduling the B-CPE 914 to communicate with the C-BS 922 through the coexistence connection 1304 for a particular coexistence operation period (e.g., a 2-frame duration or other useful duration). The B-CPE 914 switches to Channel B and decodes the MAP of the C-BS 922. The B-CPE 914 then sends a bandwidth request via the scheduled CPS. The C-BS 922 processes the request(s) and grants or allocates bandwidth to the B-CPE 914 for communicating with the B-CPE 914, and the C-BS 922 and B-CPE communicate with each other using the allocated bandwidth, e.g., transmit coexistence messages. During the B-CPE-to-C-BS communication period, the C-BS does not schedule CPS for the B-CPE 914. However, the C-BS 922 resumes scheduling of CPS for the B-CPE 914 after the communications with the B-CPE 914 is completed as shown in FIG. 14.

Communications step 1040 continues with B-CPE-to-S-BS communications. After the coexistence operation period ends, the S-BS 912 schedules periodic CPS for asynchronized B-CPE-to-S-BS communications until the B-CPE-to-S-BS communications are reestablished. After B-CPE-to-C-BS communications, the B-CPE 914 switches back to Channel A and decodes the MAP of S-BS 912 and searches or monitors for CPS of the S-BS 912. The B-CPE 914 sends bandwidth allocation requests to the S-BS 912 via the scheduled CPS. The S-BS 912 processes the requests and grants bandwidth to the B-CPE 914 for communicating with the B-CPE 914. The S-BS 912 and B-CPE communicate with each other using the allocated bandwidth as shown in FIG. 14.

Communications between the S-BS 912 and the C-BS 922 via CPE1 926 would follow a similar procedure as specified above with reference to 1400. Note, timing is typically not a critical issue in this case because communications 1400 can be performed with enough time before the coexistence resolution (e.g., channel switching) and the services of both WRANs 910, 920 are not interrupted. In contrast, in the single channel case described with reference to FIGS. 1-8, timing is more important as services of one WRAN are interrupted while performing channel request/contention.

The method 1000 continues at 1050 with a determination of whether channel switching is to occur. If not, inter-base station communications continue at step 1040. If yes, each base station 912, 922 is operated to cease operations on the presently occupied channel and to begin or hop to the frequency of the other channel (e.g., hop from Channel A to Channel B or vice versa). The method 1000 continues at 1040 or ends at 1090. FIG. 15 illustrates the system 900 after WRAN1 910 has switched to operations on Channel B and WRAN2 920 has switched to operations on Channel A. This may be considered a coexistence resolution in the case of channel flipping with S-BS 912 and B-CPE 914 switching to Channel B from Channel A and C-BS 922, CPE2 924, and CPE1 926 switching to Channel A from Channel B.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method of scheduling communications in a base station capable of operating a wireless network over a shared channel, comprising:
    establishing a wireless service connection with a bridge consumer premise equipment (CPE) system over the shared channel, wherein the bridge CPE system establishes a wireless coexistence connection over the shared channel with a second base station, and wherein the second base station allocates time slots on the shared channel for communications between the base station and the bridge CPE system;
    transmitting coexistence information including spectrum contention numbers to the second base station including performing communications with the bridge CPE system during the allocated time slots;
    prior to releasing the shared channel, receiving a coexistence request from the second base station via the bridge CPE system using a coexistence time slot on the shared channel and in response, performing a spectrum contention for ownership of the shared channel and reporting results of the spectrum contention to the second base station using a coexistence time slot on the shared channel;
    when the second base station wins the spectrum contention, instructing the bridge CPE system to perform the establishing of the wireless coexistence connection for use after releasing of the shared channel and instructing the bridge CPE system to request the allocated time slots to allow for communications with the bridge CPE system on the shared channel; and
    releasing the shared channel.

2. The method of claim 1, further comprising prior to releasing the shared channel, receiving a captured existence announcement from the second base station through the bridge CPE system, and instructing the bridge CPE system to notify the second base station of existence of the base station using a coexistence time slot.

3. The method of claim 1, further comprising after releasing the shared channel, monitoring the allocated time slots for feedback messages from the bridge CPE system, wherein at least a portion of the allocated time slots are scheduled in an uplink sub-frame.

4. The method of claim 1, wherein the coexistence information comprises a spectrum contention from the base station for the shared channel and the method further comprising in response, allocating at least a portion of bandwidth on the shared channel based on transmitted requests from the second base station for time slots on the shared channel for inter-base station communications including spectrum contention transmittals.

5. A base station implementing the method of claim 1.

6. A method of scheduling communications in a base station capable of operating a wireless network over a shared channel, comprising:
   establishing a wireless coexistence connection with a bridge consumer premise equipment (CPE) system over the shared channel, wherein the bridge CPE system establishes a wireless service connection over the shared channel with a second base station;
   allocating time slots on the shared channel for communications with the second base station and the bridge CPE system, wherein the base station and the CPE system do not transmit on the shared channel during the allocated time slots;
   receiving coexistence information including spectrum contention numbers from the second base station including performing communications with the bridge CPE system during the allocated time slots;
   prior to a releasing of the shared channel by the second base station, sending a coexistence request to the second base station via the bridge CPE system using a coexistence time slot on the shared channel and in response, receiving results of a spectrum contention for ownership of the shared channel from the second base station using a coexistence time slot on the shared channel after the spectrum contention by the second base station;
   detecting a releasing of the shared channel by the second base station; and
   after the releasing of the shared channel by the second base station, establishing a wireless service connection to a CPE system over the shared channel.

7. The method of claim 6, further comprising prior to the releasing of the shared channel by the second base station, announcing its existence in a coexistence time slot on the shared channel, capturing the existence announcement with the bridge CPE system and reporting the captured existence announcement to the second base station with the bridge CPE system, and receiving notification from the bridge CPE system as instructed by the second base station of existence of the second base station using a coexistence time slot.

8. The method of claim 6, wherein the receiving of the coexistence information further comprises receiving the coexistence information from the bridge CPE system through assigned transmission opportunities granted by a transmission schedule on the shared channel for the base station obtained by the bridge CPE system.

9. The method of claim 6, wherein the coexistence information comprises a spectrum contention from the second base station for the shared channel and the method further comprising in response, releasing the shared channel while maintaining the coexistence connection with the bridge CPE and transmitting requests for time slots on the shared channel for inter-base station communications including spectrum contention transmittals.

10. A base station implementing the method of claim 6.

11. An inter-base station communication method in a base station for use in scheduling communications with one or more neighboring base stations operating wireless cells or networks using two or more channels, comprising:
   establishing a wireless service connection on a channel with a bridge consumer premise equipment (CPE) system;
   announcing its existence in coexistence time slots on the channel;
   transferring and receiving existence announcements to and from the bridge CPE system, wherein the existence announcements comprise data on the base stations including channel usage;
   communicating with a second base station via the bridge CPE system using the channel and a second channel,
   wherein the bridge CPE system establishes a wireless coexistence connection over the second channel with the second base station,
   wherein the coexistence connection is used for transmitting coexistence information including spectrum contention number, and wherein
   the communicating comprises scheduling periodic coexistence polling slots on the channel for communications with the bridge CPE system;
   scheduling the bridge CPE system to communicate with the second base station using the coexistence connection for a coexistence operation period; and
   after the coexistence operation period, receiving bandwidth requests from the bridge CPE system in an identified period coexistence polling slots on the channel and communicating with the bridge CPE system on the channel using bandwidth allocated by the base station based on the bandwidth requests sent by the bridge CPE system.

12. The method of claim 11, wherein the communicating comprises scheduling a mutual switching with the second base station from the channel and the second channel to operations on the second channel and the channel, respectively.

13. A base station implementing the method of claim 11.

14. An inter-base station communication method in a base station for use in scheduling communications with one or more neighboring base stations operating wireless cells or networks using two or more channels, comprising:
   establishing a wireless service connection on a channel with a plurality of consumer premise equipment (CPE) systems;
   announcing its existence in coexistence time slots on the channel;
   transferring and receiving existence announcements to and from a bridge CPE system, wherein the bridge CPE system has a wireless service connection on a second channel with a second base station, and wherein the existence announcements comprise data on the base station including channel usage;
   establishing a wireless coexistence connection over the second channel with the bridge CPE system;
   communicating with the second base station via the bridge CPE system using the channel and the second channel,
   wherein the coexistence connection is used for transmitting coexistence information including spectrum contention number, and wherein
   the communicating comprises scheduling periodic coexistence polling slots on the channel for communications with the bridge CPE system; and
   receiving bandwidth requests in scheduled coexistence polling slots from the bridge CPE system for use in communications with the bridge CPE and communicating on the channel in any bandwidth allocated by the base station in response to the bandwidth requests.

15. The method of claim 14, wherein the communicating comprises scheduling a mutual switching with the second base station from the channel and the second channel to operations on the second channel and the channel, respectively.

16. A base station implementing the method of claim 14.

17. A communications method in a bridge consumer premise equipment (CPE) for wireless regional area network (WRAN) systems operating on a single shared channel, comprising:
- wirelessly communicating with a first and second WRANs each operated by base stations on the shared channel;
- establishing a wireless service connection with a base station of the first WRAN on the shared channel and a wireless coexistence connection with the base station of the second WRAN, wherein the coexistence connection is used for transmitting coexistence information including spectrum contention numbers;
- relaying a request for use of the shared channel from the base station of the second WRAN to the base station of the first WRAN in coexistence time slots on the shared channel;
- receiving instruction from the base station of the first WRAN to request reserved time slots from the base station of the second WRAN in which the second WRAN will not operate on the shared channel, whereby the base station of the first WRAN is able to communicate without interference with the bridge CPE on the shared channel; and
- receiving a message from the base station of the first WRAN in one of a requested reserved time slots and forwarding the message to the base station of the second WRAN through a transmission time allocated in the transmission schedule of the base station of the second WRAN on the shared channel for bridge CPE to base station communications.

18. The method of claim 17, further comprising prior to the establishing of the wireless coexistence connection, relaying an existence announcement from the base station of the second WRAN to the base station of the first WRAN via the bridge CPE.

19. The method of claim 17, further comprising prior to the establishing of the wireless coexistence connection, relaying an existence announcement from the base station of the first WRAN to the base station of the second WRAN via the bridge CPE.

20. The method of claim 17, wherein the request for use of the shared channel comprises spectrum contention information.

21. A CPE implementing the method of claim 17.

* * * * *